United States Patent
Hinami et al.

(10) Patent No.: US 6,468,157 B1
(45) Date of Patent: *Oct. 22, 2002

(54) GAME DEVICE

(75) Inventors: Masahiro Hinami, Tokyo (JP); Toshiyasu Kamiko, Tokyo (JP); Takaharu Terada, Tokyo (JP); Yasushi Fujisawa, Tokyo (JP)

(73) Assignee: Kabushiki Kaisha Sega Enterprises, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,422

(22) Filed: Dec. 4, 1997

(30) Foreign Application Priority Data

Dec. 4, 1996 (JP) ............................................. 8-324208

(51) Int. Cl.⁷ ................................................. A63F 9/22
(52) U.S. Cl. ............................ 463/32; 463/31; 463/33; 345/419; 345/427; 345/473
(58) Field of Search ....................... 463/31–33; 345/427, 345/473, 419

(56) References Cited

U.S. PATENT DOCUMENTS

| | | | | |
|---|---|---|---|---|
| 4,552,360 A | * | 11/1985 | Bromley et al. | 273/85 G |
| 4,672,541 A | * | 6/1987 | Bromley et al. | 364/410 |
| 4,969,647 A | * | 11/1990 | Mical et al. | 273/85 G |
| 5,470,080 A | * | 11/1995 | Naka et al. | 273/437 |
| 5,616,079 A | * | 4/1997 | Iwase et al. | 463/32 |
| 5,732,204 A | * | 3/1998 | Fukushima et al. | 395/127 |
| 5,734,807 A | * | 3/1998 | Sumi | 395/127 |
| 5,755,620 A | * | 5/1998 | Yamamoto et al. | 463/34 |
| 5,912,671 A | * | 6/1999 | Oka | 345/427 |
| 5,920,321 A | * | 7/1999 | Owen et al. | 345/427 |
| 6,017,272 A | * | 2/2000 | Rieder | 463/31 |
| 6,139,433 A | * | 10/2000 | Miyamoto et al. | 463/32 |
| 6,142,871 A | * | 11/2000 | Inoue | 463/6 |

* cited by examiner

Primary Examiner—Michael O'Neill
Assistant Examiner—Carmen D. White
(74) Attorney, Agent, or Firm—Keating & Bennett, LLP

(57) ABSTRACT

It is an object of this invention to provide a method of expressing, in an easily visible manner, a game proceeded in a plurality of game fields formed hierarchically. At least first and second game fields are hierarchically formed in a three-dimensional virtual space. It is possible to enjoy games proceeded simultaneously and in parallel in upper and lower spaces by displaying the proceeds of the games in the respective fields as seen from a viewpoint in the space.

4 Claims, 20 Drawing Sheets

FIG.9
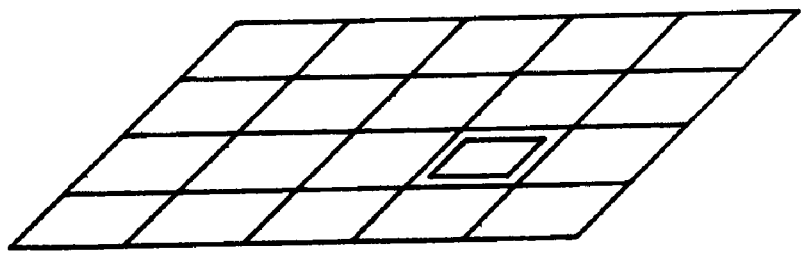
PLANE OF THE SKY
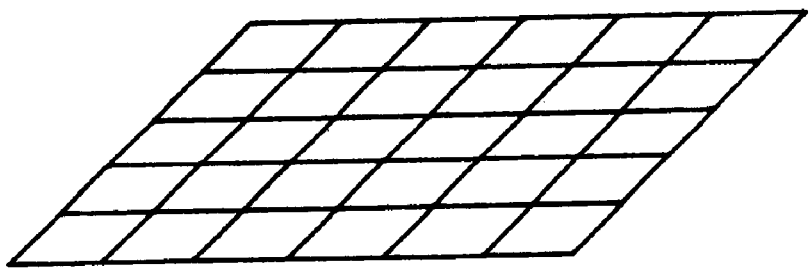
PLANE OF THE GROUND

FIG.10
PLANE OF THE SKY
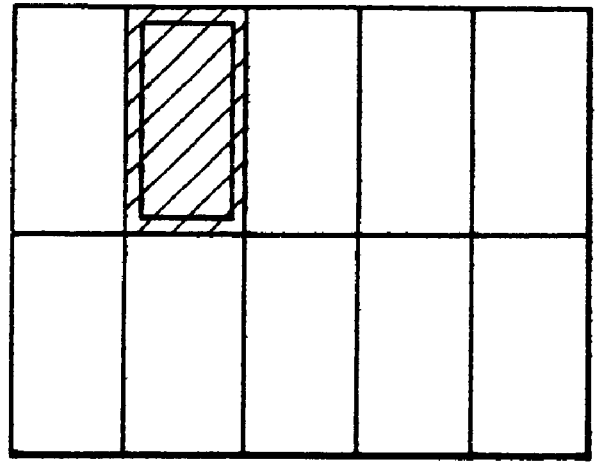
PLANE OF THE GROUND
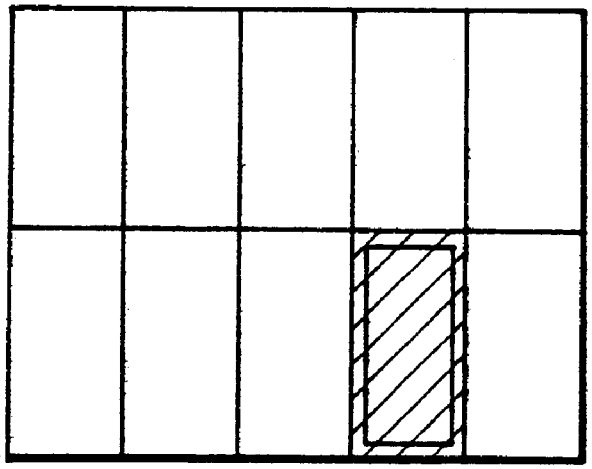

GAME DEVICE

BACKGROUND OF THE INVENTION

The present invention relates to a suggested game device for forming game fields of multiple hierarchies in a three-dimensional virtual space and for playing a game in a plurality of game fields where the game proceeds simultaneously.

With the progress of computer technology, video game devices utilizing computer graphics technology have come to be widely used. This type of video game devices are widely accepted by users. A large number of various kinds of game devices have been devised and various game software products have been supplied.

For example, there is a battle game in which a base and tanks, etc. placed on the ground fight against helicopters, fighter planes and attack planes in the sky. In such a game, objects (such as airplanes) in the sky and objects (such as tanks) on the ground are displayed simultaneously on one plane and each object is controlled by one game program.

However, it is difficult to express both the objects on the ground and the objects in the sky on one plane in an easily visible manner. Moreover, since moving speeds and moving properties of the objects on the ground are usually very different from those of the objects in the sky, it is difficult to properly control the movements of all objects at a common time axis. If programs of different time axes are made to proceed separately for the sky and the ground, it is difficult to link a system for the sky with a system for the ground and to express the objects in the sky and on the ground simultaneously at the same point of time. Furthermore, it is desirable to realistically express phenomena such as rain.

Accordingly, it is an object of the present invention to provide a method of making a game, which is proceeded in a plurality of hierarchically formed game fields, easily visible.

It is another object of this invention to provide an easily visible cursor which indicates corresponding sites in upper and lower game fields in a three-dimensional manner.

It is a further object of this invention to provide a game device capable of forming pictures which will give a visual effect of, for example, rain drops falling from the sky.

SUMMARY OF THE INVENTION

In order to achieve the above-described objects, a game device of this invention is a game device for proceeding a game by placing objects related to the game in a three-dimensional virtual space and by controlling the objects. The game device comprises: first game proceeding means (S102 and S104) for proceeding the game by controlling,the objects in a first game field in the three-dimensional virtual space; second game proceeding means (S106 and S108) for proceeding the game by controlling the objects in a second game field in the three-dimensional virtual space; and picture transformation display means (S5116) for forming a screen picture by transforming the coordinates of each object in the first and second game fields existing within view of a viewpoint located in the three-dimensional virtual space.

This construction makes it possible to express the game proceeded in a plurality of game fields simultaneously. It is possible to control each field by using separate algorithms and to independently set a time axis, a display scale or the like for indicating the progress of a game.

According to this invention, a game device for proceeding a game by placing objects related to the game in a three-dimensional virtual space and by controlling the objects, comprises: first game proceeding means (S102 and S104) for proceeding the game by controlling the objects in a first game field in the three-dimensional virtual space; second game proceeding means (S106 and S108) for proceeding the game by controlling the objects in a second game field in the three-dimensional virtual space; mutual processing means (S112 and S114) for processing the game between the first and second game fields and for placing and controlling the objects in relation to the processing; and perspective transformation display means (S116) for forming a screen picture by transforming the coordinates of each object within view of a viewpoint located in the three-dimensional virtual space.

This construction makes it possible to proceed a game independently in the respective fields and to proceed a game with, for example, mutual intervention between the fields and linking of events.

The first game proceeding means and the second game proceeding means are capable of determining respective proceeding speeds(or scroll speeds) of the first game field and the second game field separately, thereby producing a sense of far and near.

Moreover, when the viewpoint is moved between the first game field and the second game field (S202 and S232), the perspective transformation display means reduces one game field and displays the reduced game field in a picture of the other game field (S204, S206, S208, S234, S236 and S238), thereby producing an ascending or descending visual effect.

A game device of this invention is a game device for proceeding a game by placing game objects related to the game in a three-dimensional virtual space and by controlling the objects, and the game device comprises: first game proceeding means for proceeding the game by controlling the game objects in a first game field in the three-dimensional virtual space, second game proceeding means for proceeding the game by controlling the game objects in a second game field in the three-dimensional virtual space; cursor object forming means (S302 through S320) for forming a cursor object indicating a certain area (S304) of one of the first and second game fields as well as an area (S312) of the other game field corresponding to the certain area; and perspective transformation display means (S320) for forming a screen picture by transforming the coordinates of the objects including the cursor object within view of a viewpoint located in the three-dimensional virtual space.

This construction makes it possible to display the corresponding areas in the game fields by using a three-dimensional cursor and to obtain a cursor which is easy to perceive visually.

The cursor object forming means forms the cursor object as a polyhedron with an area of one game field as its top and with an area of the other game field as its bottom, thereby the corresponding areas are directly indicated and are easily perceivable.

Since the cursor object forming means is capable of displaying information on the side face of the cursor object, it is possible to apprehend various information during a game.

The cursor object forming means sets display scales of the top and bottom of the cursor object, respectively corresponding to the display scales of the first and second game fields. Accordingly, it is possible to express in an easily visible manner the corresponding areas in the game fields where games of different display scales are proceeded.

A game device of this invention is a game device for proceeding a game in a game field formed in a three-dimensional virtual space, and the game device comprises: cursor moving means for moving a cursor in the game field in accordance with operation; viewpoint moving means for moving a viewpoint located in the three-dimensional virtual space in accordance with the cursor; coordinate transforming means for transforming a view range of the viewpoint to a screen coordinate system; and viewpoint position adjusting means (S416) for adjusting a position of the viewpoint so that a non-mapping area will not appear on the screen when the view range extends beyond a mapping area, in which a picture of the game field is drawn, to the non-mapping area (S412).

The viewpoint position adjusting means adjusts the position of the viewpoint on condition that the cursor has moved beyond the view range.

A game device of this invention is a game device for proceeding a game in a game field formed in a three-dimensional virtual space, and the game device comprises: viewpoint moving means for moving a viewpoint in conformity with a cursor moving in the game field in accordance with operation; coordinate transforming means (S406) for transforming a position of the cursor from a three-dimensional coordinate system to a display coordinate system; and viewpoint position adjusting means (S412, S416 and S414) for finding the position of the viewpoint with the cursor being located at a central position of a display range of a screen (S410) and for adjusting the position of the viewpoint when the position of the viewpoint is beyond a margin area so that the viewpoint will be located within the margin area.

The margin area is the area where the viewpoint can be moved without causing the non-mapping area of the game field to appear.

A game device of this invention comprises: a memory (V-RAM) for storing, as picture data, a plurality of patterns of different sizes in a plurality of areas divided in accordance with a line number in one frame; a picture data processing device (VDP) for reading the picture data from the memory, processing the data at a designated reduction/expansion factor, and supplying the processed data to a picture display device; reduction/expansion factor setting means (S508) for finding a reduction/expansion factor, which corresponds to the position on a screen as specified by the frame and line of a video signal to be drawn, on the basis of a first function and for setting the reduction/expansion factor at the picture data processing device; pattern size outputting means (S510) for determining, on the basis of a second function, a size pattern corresponding to the position on the screen; and reading position setting means (S514 through S520) for obtaining an address of the pattern to be read from the memory on the basis of the position on the screen and a moving speed on the screen as decided for the determined pattern, and for setting the address at the picture data processing device.

This construction makes it possible to produce a visual effect of, for example, causing rain drops to seem falling from the sky down to the ground.

Moreover, this invention relates to an information storage medium with a program stored thereon, the program for activating a computer system as the game device described above.

BRIEF DESCRIPTION OF THE DRAWINGS

FIG. 9 describes an example of the use of a cursor in two game fields.

FIG. 10 describes an example in which the correlation between the two areas is shown with the cursor.

DETAILED DESCRIPTION OF THE INVENTION

Figure 1:
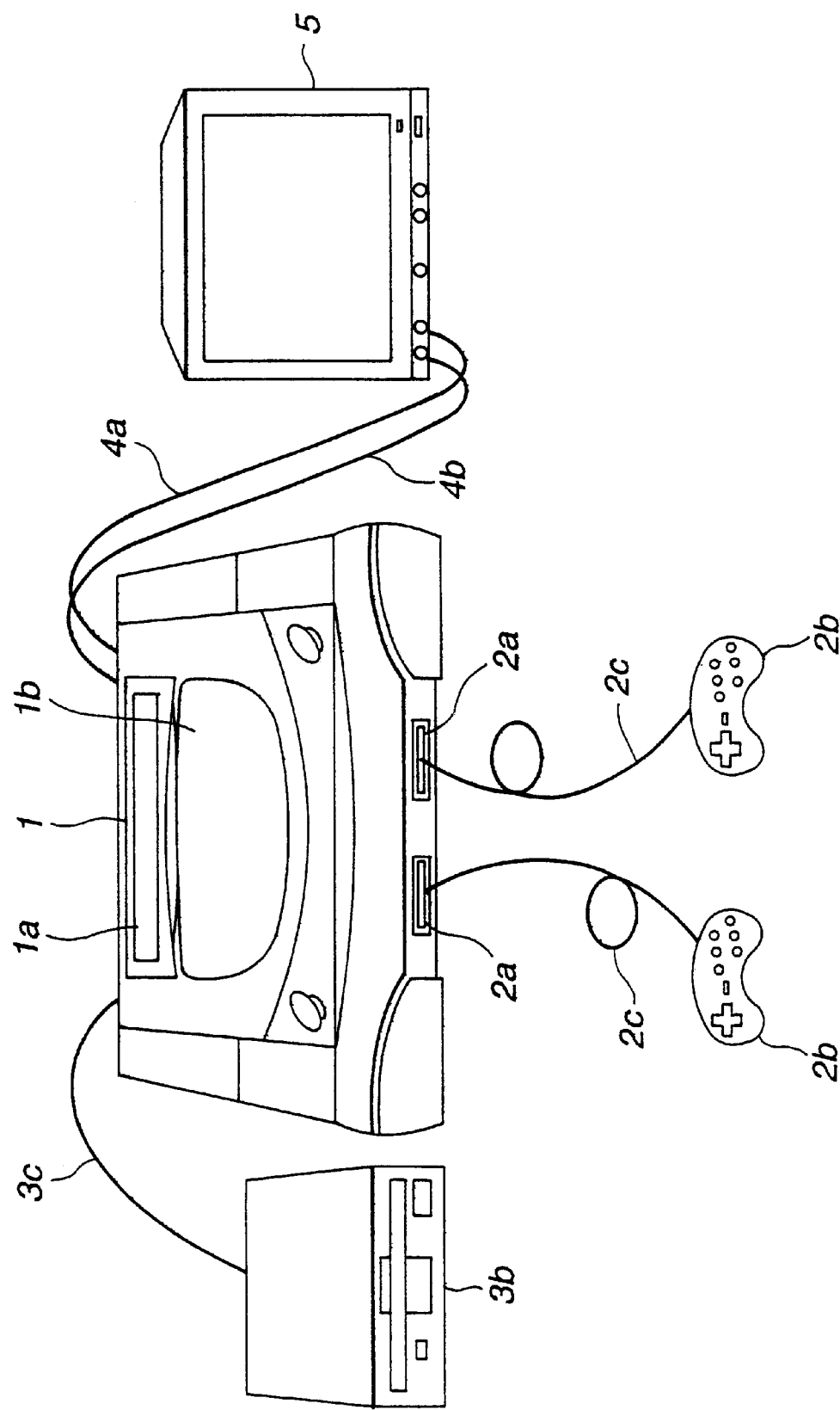
FIG. 1 shows the appearance of a game device of an embodiment of this invention.

Embodiments of the present invention are hereinafter explained with reference to drawings. First, an explanation is given about an example of a game device (or computer system) for executing this invention. FIG. 1 shows the appearance of a video game device according to an embodiment of this invention. In FIG. 1, a main video game device 1 has a substantial box shape, inside of which substrates and other elements for game processing are provided. At the front side of the main video game device 1, two connectors 2a are provided, to which pads 2b for game operation are connected through cables 2c. When two players play, for example, a bombing game, two pads 2b are used.

At the top of the main video game device 1, a cartridge I/F 1a for connection to a ROM cartridge and a CD-ROM drive 1b for reading a CD-ROM are provided. At the back of the main video game device 1, a video output terminal and an audio output terminal (not shown) are provided. This video output terminal is connected to a video input terminal of a TV picture receiver through a cable 4a, and the audio output terminal is connected to an audio input terminal of the TV picture receiver 5 through a cable 4b. With such a video game device, a user can play a game by operating the pad 2b while watching pictures displayed on the TV picture receiver 5.

At the back of the main video game device 1, there is also a connector (not shown) for connection to peripheral equipment. This connector for peripheral equipment is connected to a floppy disk drive (FDD) 3b, which is a peripheral, through a cable 3c.

Figure 2:
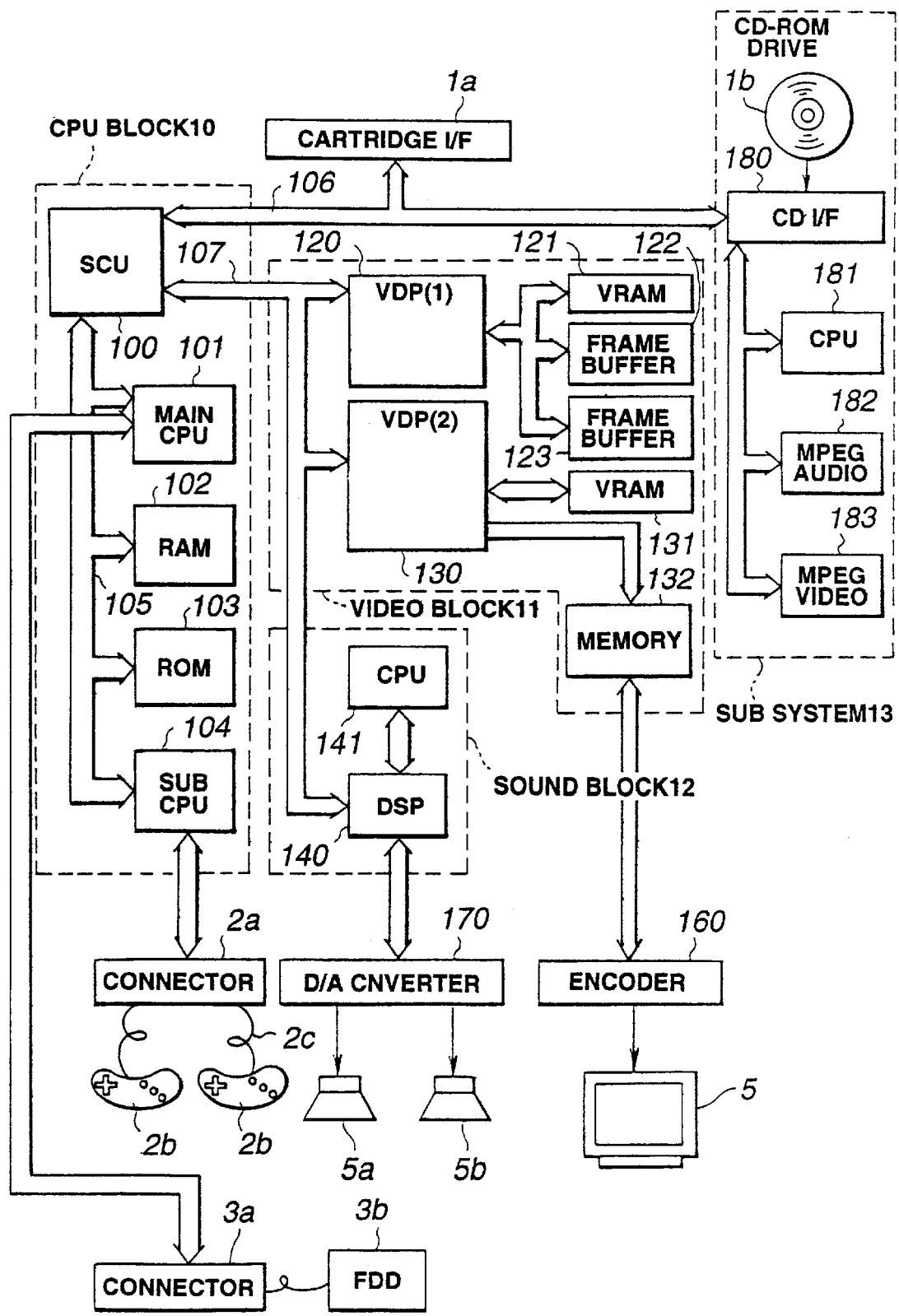
FIG. 2 is a functional block diagram of the game device of the embodiment of this invention.

FIG. 2 is a block diagram showing the outline of a TV game device according to this embodiment. This picture processing device is composed of: a CPU block 10 for controlling the device in its entirety; a video block 11 for controlling the display of a game screen; a sound block 12 for generating sound effects or the like; a subsystem 13 for reading a CD-ROM; and other elements.

The CPU block 10 is composed of an SCU (System Control Unit) 100, a main CPU 101, a RAM 102, a ROM 103, a cartridge I/F 1a, a sub-CPU 104, a CPU bus 105 and other elements. The main CPU 101, which is composed of a master CPU SH and a slave CPU SH, controls the device in its entirety. This main CPU 101 comprises the same operating function inside as that of a DSP (Digital Signal Processor) and is capable of executing application software at a high speed. The main CPU 101 automatically recognizes the type of peripheral (FDD 3b in FIG. 2) connected to the connector 3a (at the back of the main game device) and performs data communication with this peripheral. Specifically speaking, the peripheral is connected to an SCI (Serial Communication Interface) contained in the main CPU 101. Moreover, the serial connector 3a is connected to three SCI signal lines respectively for the master CPU SH and for the slave CPU SH and is also connected to a MIDI in/out line from an SCSP (sound DSP). The FDD. 3b is used, for example, to store data of a backup memory (not shown) (which stores various kinds of data and parameters for a game) on a floppy disk and to copy data of a floppy disk onto the backup memory.

The RAM 102 is used as a work area for the main CPU 101. The ROM 103 has, for example, an initial program for initialization written thereon. The SCU 100 is designed to perform smooth input and output of data between, for example, the main CPU 101, VDPs 120 and 130, the DSP 140, and the CPU 141 by controlling buses 105, 106 and 107. The SCU 100 comprises a DMA controller inside and is capable of transmitting sprite data during a game to a VRAM within the video block 11. This makes it possible to execute application software of, for example, a game at a high speed. The cartridge I/F 1a is designed to input application software which is supplied in a ROM cartridge form.

The sub-CPU 104 is called an SMPC (System Manager & Peripheral Control) and is provided with, for example, a function to collect peripheral data from the pad 2b through the connector 2a upon request of the main CPU 101. The main CPU 101 conducts processing, for example, to move attack planes on a game screen on the basis of the peripheral data received from the sub-CPU 104. The connector 2a can be connected to an optional peripheral among a pad, a joystick, a keyboard and the like. The sub-CPU 104 is provided with a function to automatically recognize the type of peripheral connected to the connector 2a (at a terminal on the main game device side) and to collect peripheral data or the like in a communication format in accordance with the type of peripheral.

The video block 11 comprises: a VDP (Video Display Processor) 120 which performs drawing of, for example, characters composed of polygon data for a video game; and a VDP 130 which performs drawing of background pictures, synthesis of polygon picture data and the background pictures, and clipping processing. The VDP 120 is connected to the VRAM 121 and frame buffers 122 and 123. Drawing data of polygons which represent characters for a video game device is sent from the main CPU 101 to the SCU 100 and then to the VDP 120 and is then written on the VRAM 121. The drawing data written on the VRAM 121 is drawn on the frame buffer 122 or 123 for drawing, for example, in a 16 bits/pixel or 8 bits/pixel format. The data drawn on the frame buffer 122 or 123 is sent to the VDP 130. Information about drawing control is sent from the main CPU 101 to the SCU 100 and then given to the VDP 120. The VDP 120 then executes drawing processing in accordance with this instruction.

The VDP 130 is connected to the VRAM. 131 and it is constructed in a manner such that picture data outputted from the VDP 130 is outputted to an encoder 160 through a memory 132. The encoder 160 adds synchronization signals or the like to the picture data, thereby generating video signals which are then outputted to a TV picture receiver 5. Accordingly, various kinds of game pictures are displayed on the TV picture receiver 5.

The sound block 12 is composed of a DSP 140 for synthesizing sound in the PCM format or the FM format, and a CPU 141 for, for example, controlling the DSP 140. Sound data generated by DSP 140 are converted into two-channel signals by a D/A converter 170, which are then outputted to a speaker 5b.

The subsystem 13 is composed of a CD-ROM drive 1b, a CD I/F 180, a CPU 181, an MPEG AUDIO 182, an MPEG VIDEO 183 and other elements. This subsystem 13 has functions, for example, to read application software supplied in a CD-ROM form and to reproduce animation. The CD-ROM drive 1b is designed to read data from a CD-ROM. The CPU 181 performs processing such as control of the CD-ROM drive 1b and correction of errors in the read data. The data read from a CD-ROM are supplied to the main CPU 101 through the CD I/F 180, the bus 106 and the SCU 100 and are utilized as application software. The MPEG AUDIO 182 and MPEG VIDEO 183 are devices for restoring data which are compressed in MPEG (Motion Picture Expert Group) standards. Restoration of the MPEG compressed data, which are written on a CD-ROM, by using the MPEG AUDIO 182 and MPEG VIDEO 183 makes it possible to reproduce animation.

Figure 3:
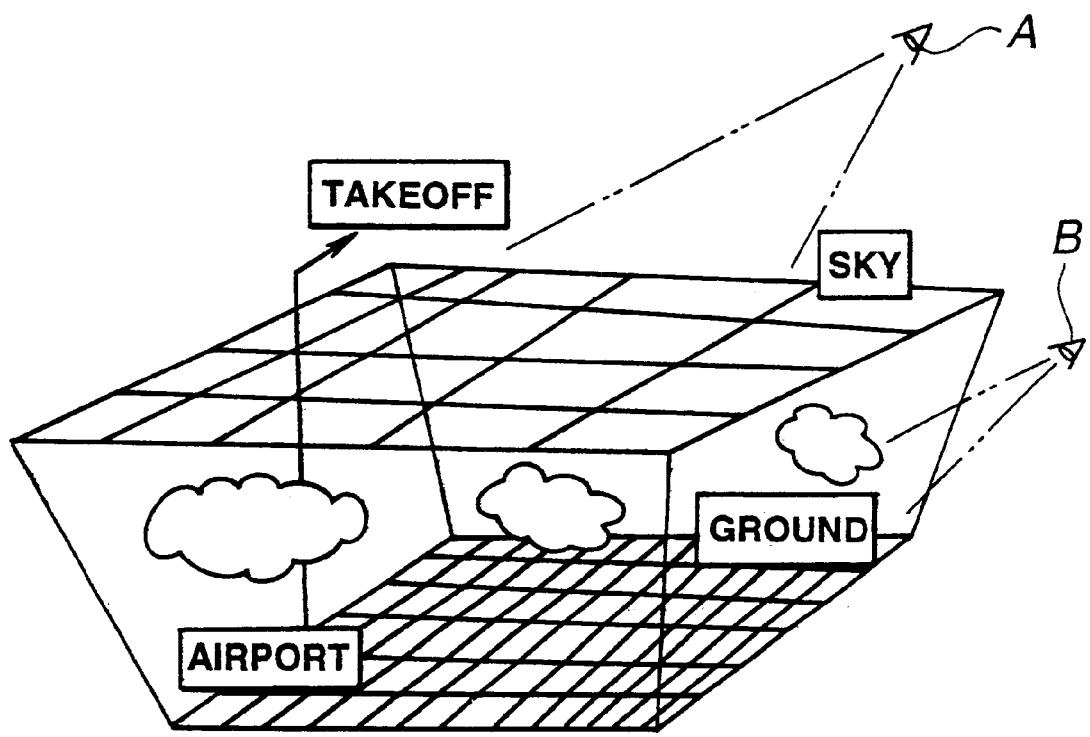
FIG. 3 describes an example of a three-dimensional virtual space.

An explanation is hereinafter given about an algorithm of a first invention. According to this embodiment, for example, as indicated in the three-dimensional virtual space in FIG. 3, a plane of the sky is set as a first game field in an area (Xn, Yn, Zh) of a world coordinate system and a plane of the ground is set as a second game field in an area (Xn, Yn, ZO) of the world coordinate system. The first and second game fields may be either a plane coordinate system (in which objects are expressed in two dimensions) or a three-dimensional coordinate system (in which objects are expressed in three dimensions). On the ground, objects related to a game (or game objects) such as bases, positions, tanks and antiaircraft fire machines are located. In the sky, airplane objects (game objects) such as attack planes and fighter planes are located. Airplanes take off from an airport on the ground and move to the first game field. Between the plane of the sky and the plane of the ground, semitransparent cloud objects are located as appropriate so that views from the objects on the ground and from the objects in the sky are obstructed adequately, thereby making a game more amusing. A viewpoint (or camera) can move in this world coordinate system, and objects which are located in the world coordinate system and are within view (or display area) are made to become subject to, for example, projection transformation or screen coordinate transformation, thereby coordinate transformation of the view in the three-dimensional space into a two-dimensional screen is executed to display the view on a monitor. The letter "A" in FIG. 3 represents an example of the viewpoint (a viewpoint at a high altitude) for observing at a high altitude the first game field (or airplanes) and the second game field (or the ground). The letter "B" in FIG. 3 represents an example of the viewpoint (a viewpoint at a low altitude) for observing at a low altitude only the second game field (or the ground). As described above, the viewpoint can move within the three-dimensional virtual space.

Figure 4:
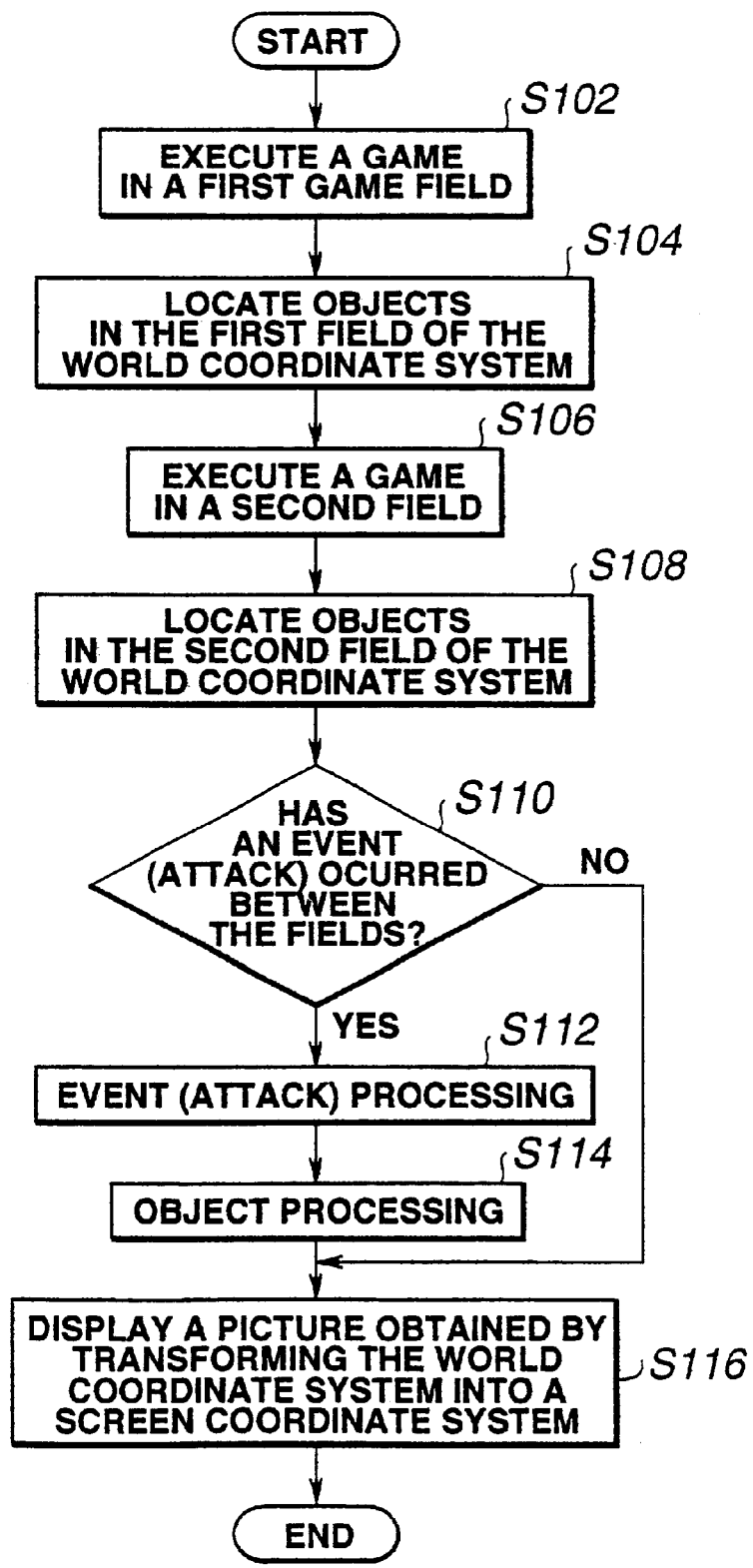
FIG. 4 is a flowchart which explains an example of an algorithm for proceeding a game by displaying, as seen from one viewpoint, objects in each of plural laminated game fields.

FIG. 4 shows the outline of an algorithm for displaying, on one screen, objects in each of the laminated game fields.

The above-described computer system proceeds a first game in a first game field in accordance with a first game program. The first game is, for example, an air battle game conducted by airplanes such as fighter planes, attack planes, helicopters and transport planes. A player can control the movements of airplanes through the pad 2b. It is also possible to designate control parameters such as a scroll speed by using the pad 2b. If an event takes place in which airplanes attack objects (for example, tanks or warships) in the second game field (on the ground or on the sea), an occurrence flag of the relevant event is set (S102). An explanation will be given later about processing for a battle conducted between two game fields.

The first game program controls positions of objects of airplanes and the relevant objects are located at the relevant positions in the first game field (S104).

In the second game field, the computer system proeeds a second game in accordance with a second game program. For example, the second game is ground warfare conducted by tanks, cannons, antiaircraft guns, bases and the like.

A player can control the movements of, for example, tanks through the pad 2b. It is also possible to designate control parameters such as a scroll speed by using the pad 2b. If an event takes place in which antiaircraft guns attack objects (for example, airplanes) in the first game field (in the sky), an occurrence flag of the relevant event is set (S106). An explanation will be given later about processing for a battle conducted between two game fields.

The second game program controls positions of objects of, for example, tanks and the relevant objects are located at the relevant positions in the second game field (S108).

It is determined whether or not an event has occurred between the game fields (S110).

If no event has occurred, games of the first game field and the second game field will proceed independently. Objects in the three-dimensional virtual space and background pictures become subject to, for example, projection transformation or transformation into a screen coordinate system within a view range as seen from a predetermined viewpoint position in the world coordinate system, thereby forming pictures for the monitor and then displaying the pictures on the TV picture receiver (S116). Then the processing returns to the main program (not shown) and the processing is repeated from the step S102, thereby forming pictures for each frame.

Figure 17:
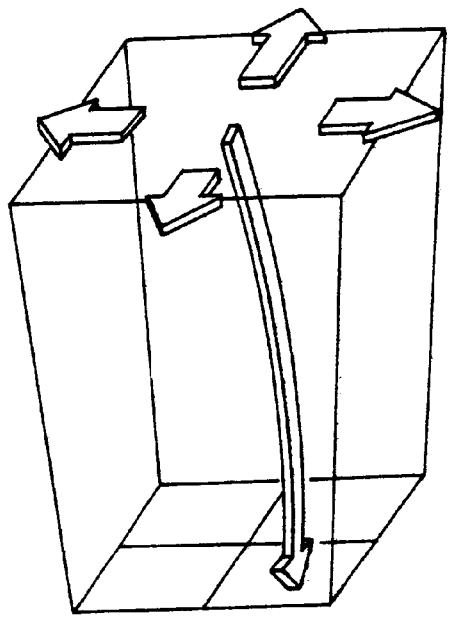
FIG. 17 describes an example of the three-dimensional cursor used for a fighter plane.
Figure 18:
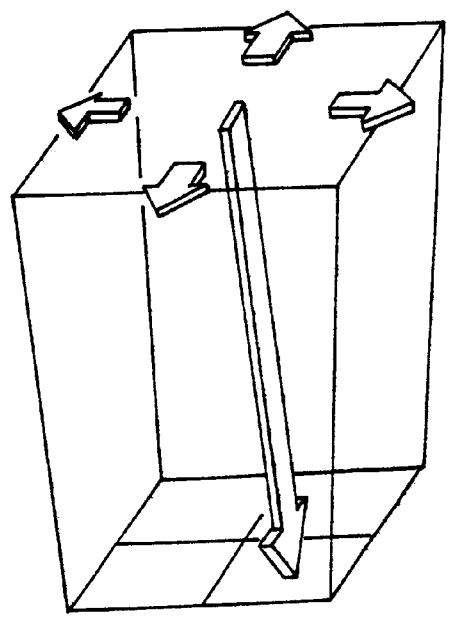
FIG. 18 describes an example of the three-dimensional cursor used for an attack plane.
Figure 19:
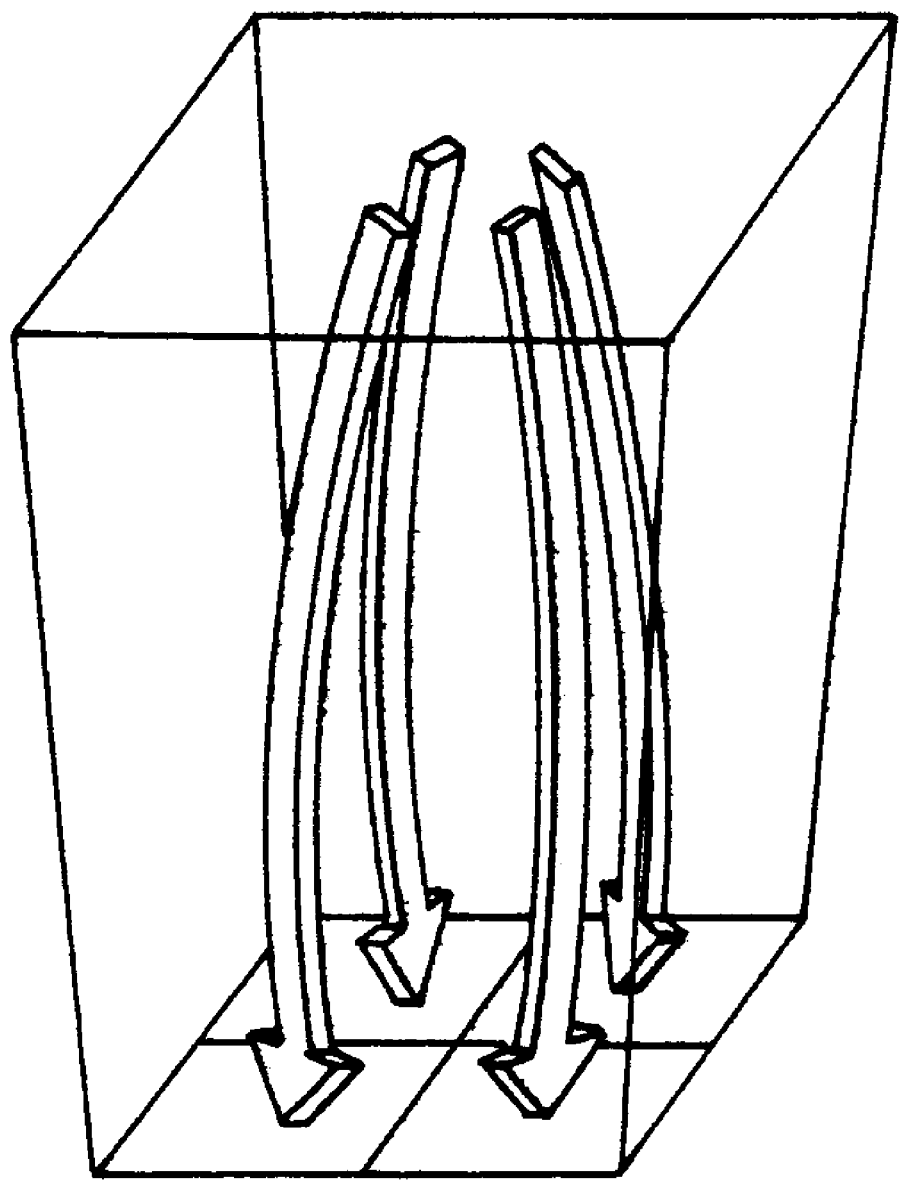
FIG. 19 describes an example of the three-dimensional cursor used for a bombing plane.

If an event has occurred between the first game field and the second game field (S110), event processing is conducted (S112). For example, in the above-described battle game, an attack between the first game field and the second game field corresponds to the event. When airplanes in the sky bomb a target on the ground, a bombing event flag is set at the step S102. Bombing parameters such as coordinates, a direction and speed of an airplane are delivered as event information to the event processing. In the bombing event processing, a bombed point on the ground and a dropping time (or the number of frames) are calculated on the basis of the bombing parameters. Objects which represent traces of bombs are located by using a certain number of frames from a bomb dropping position to the bombed point (for example, as shown in FIGS. 17 through 19 described later). When an object such as a tank exists within a predetermined range of the bombed point, the tank object is replaced with an object which represents a tank in a destroyed state. A sound of explosion or the like is set.

When an antiaircraft fire is performed from the ground against airplanes in the sky, an event of antiaircraft fire takes place. Accordingly, antiaircraft shooting parameters such as firing coordinates, a firing direction and a shooting range of an antiaircraft firing gun are delivered to event processing. In the event processing, a trajectory is calculated on the basis of the antiaircraft shooting parameters, and a reaching time to the second game field and whether or not a bullet will hit an airplane are determined (S112). An object representing a trajectory is located for the number of frames corresponding to the reaching time. When an airplane object of the first game field exists on the trajectory, a destroyed airplane object is located for a short period of time and is then extinguished (S114). The processing of the event between the game fields is conducted by locating objects corresponding to the event occurred and by controlling the objects.

Objects of the first and second game fields, which are located in the three-dimensional virtual space, become subject to, for example, projection transformation or transformation into the screen coordinate system within a view range as seen from a predetermined viewpoint position in the world coordinate system, thereby forming pictures for the monitor and then displaying the pictures on the TV picture receiver (S116). Then the processing returns to the main program and the processing is repeated from the step S102, thereby forming pictures for each frame.

An interaction between the first game field and the second game field is not necessarily required. For example, it is possible to set the first game field as a travel on a balloon and to set the second game field as a scene on the ground where cars or ships move. It is also possible to proceed games which have no relationship to each other. For example, it is possible to play the game of "shogi" in the first game field and the game of "go" in the second game field.

Figure 5:
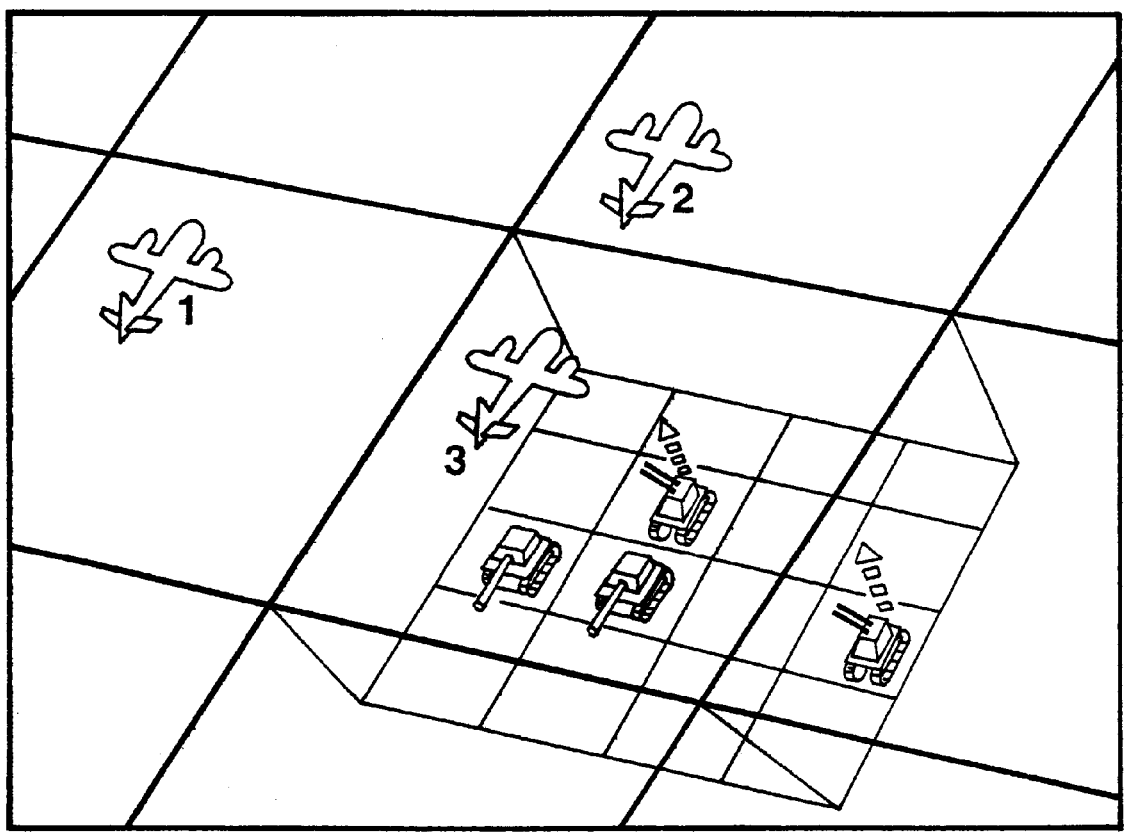
FIG. 5 describes an example of a bombing game proceeded in two game fields.

FIG. 5 explains an example of a bombing game as described above. Game objects are developed in two game fields, that is, on the plane of the sky (the first game field) located at an upper position and on the plane of the ground (the second game field) located at a lower position. It is possible to display the respective game fields on the same scale or different scales. It is possible to enhance a three-dimensional taste by scrolling the game field at the front as seen from the viewpoint at a higher speed than that of the game field at the back.

As the objects on the plane of the sky, there are bombing planes 1 through 3, fighter planes (not shown), missiles (not shown) and the like on the opponent's side or the player's side. As the objects on the plane of the ground, there are tanks, antiaircraft guns, antiaircraft missiles and the like on the opponent's side or the player's side. A bombing plane can attack (or bomb) the objects on the ground within an area where it is located. For example, if a player selects the bombing plane 3, an area on the ground corresponding to an area of the bombing plane 3 is displayed with a frame. The bombing plane 3 can select an attack target within the area. On the contrary, the bombing plane 3 receives an attack from antiaircraft vehicles within the area.

Figure 6:
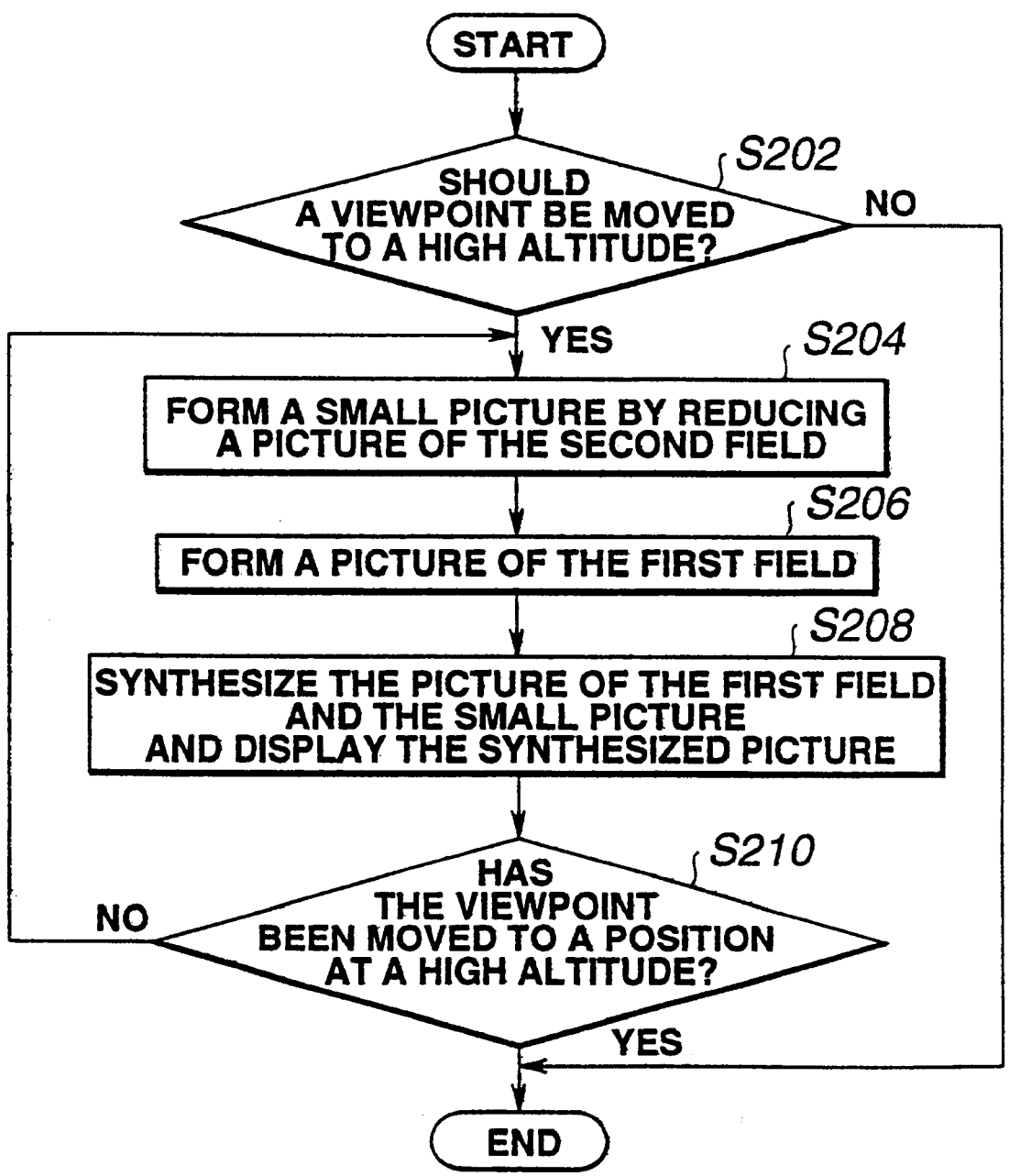
FIG. 6 is a flowchart which explains an algorithm of a screen which gives a visual effect of ascending as a viewpoint is moved from a low altitude to a high altitude.
Figure 7:
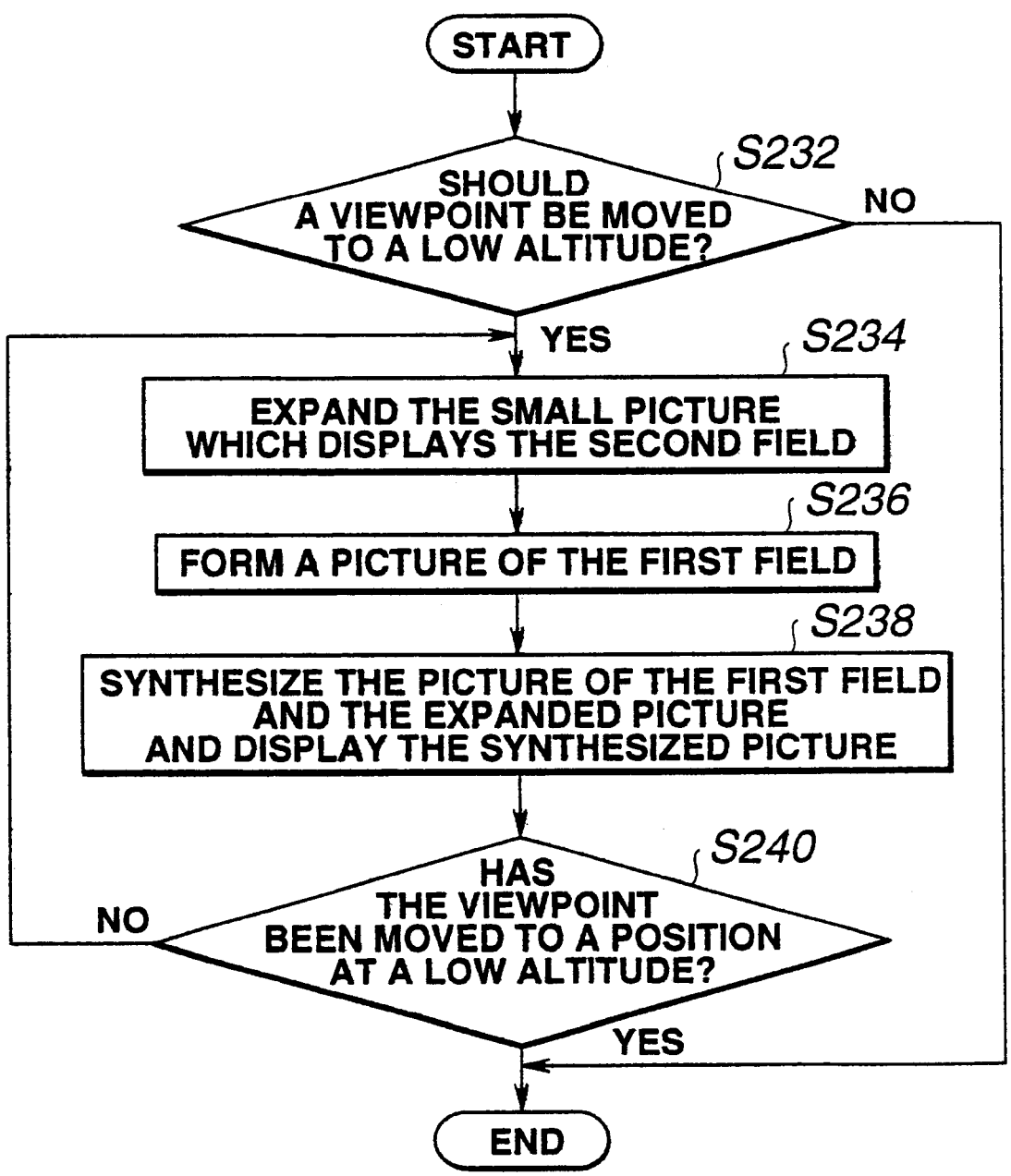
FIG. 7 is a flowchart which explains an algorithm of a screen which gives a visual effect of descending as a viewpoint is moved from a high altitude to a low altitude.
Figure 8:
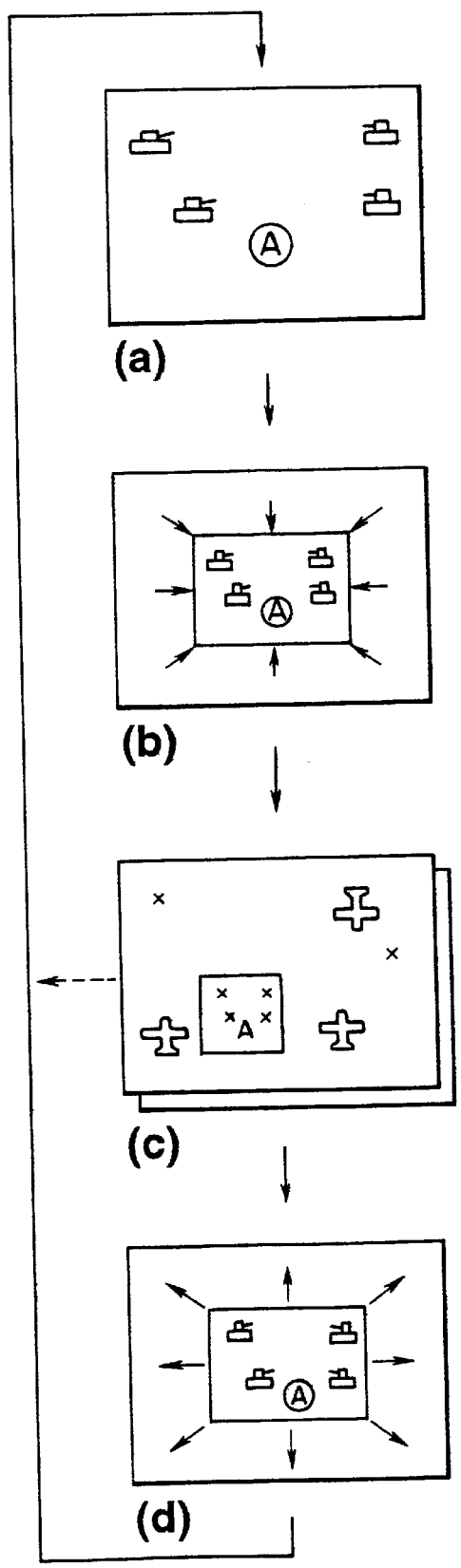
FIG. 8 shows picture examples of ascent and descent of the viewpoint.

FIGS. 6 and 7 are flowcharts which explain examples of screen displays when the viewpoint is moved between a low altitude and a high altitude in the three-dimensional virtual space. FIG. 8 explains a movement process. In this example, when the viewpoint is moved from a low altitude to a high altitude, it is necessary to transform the coordinates of all the objects within view of each viewpoint moving in the three-dimensional virtual space in order to obtain screen pictures, thereby continuously displaying pictures in the movement process. However, the amount of operation becomes enormous. Accordingly, instead of the above-described operation, a simpler arithmetic operation is used to obtain a similar visual effect.

As shown in FIG. 8(a), the viewpoint is first located at a position to overlook a map of the ground (the second game field). If a player selects an airport A on this map, the main program distinguishes the selection and selects an algorithm for movement of the viewpoint to a high altitude as shown in FIG. 6 (S202).

First, a picture of the second game field as seen from the viewpoint at a low altitude is formed. This picture in its entirety is gradually reduced toward the center of the screen to form a reduced picture (S204). A picture of the first game field as seen from the viewpoint at a high altitude is formed (S206). The picture of the first game field and the reduced picture of the second picture are synthesized to display a picture of the first game field at a high altitude in the area surrounding the reduced picture as shown in FIG. 8(b). The steps S204 through S208 are repeated until the viewpoint is moved to a target viewpoint position at a high altitude (or until a predetermined amount of time has elapsed) (S210).

Accordingly, it seems as if the picture of the second game field reduces toward the center and the first game field expands around the reduced picture of the second game field. This makes it possible to give a player a visual effect of making him/her feel like taking off from the airport to the sky. As shown in FIG. 8(c), it is possible to leave the reduced picture of the ground at a part of the picture of the sky. After the picture has shifted to that of the sky, it becomes possible to control the airplane objects.

FIG. 7 is an algorithm showing an example of screen display in the case of descent. When a small picture (as shown in FIG. 8(c)) which shows the state on the ground is selected, or when game conditions upon shifting to the map of the ground, for example, conditions of an attack at a low altitude or a crash are satisfied (S232), the viewpoint at a high altitude is moved to the viewpoint at a low altitude.

Namely, the small picture showing the ground, which is displayed in the picture displaying the first game field, is expanded (S234). A picture of the first game field as seen from the viewpoint at a high altitude is formed (S236). The small picture expanding outward is synthesized onto the picture showing the first game field to display a synthesized picture (S238). The steps S234 through S238 are repeated until the viewpoint is moved to the target viewpoint position at a low altitude (or until a predetermined amount of time has elapsed) (S240). As a result, a picture of the ground which is expanding is displayed as shown in FIG. 8(d), thereby producing a visual effect of descending from a high altitude to a low altitude.

Although with the above-described embodiment an explanation has been given about an example of two game fields, the plane of the sky and the plane of the ground, there is no limitation about the mode of the game fields. For example, the plane of the ground can be a plane of the sea and a battle between ships and airplanes can be performed. Moreover, the game fields are not limited to two. For example, in an antisubmarine warfare game, airplane objects are located on the plane of the sky of a top layer (the first game field), and objects such as warships are located on the plane of the sea of a middle layer (the second game field), and objects such as submarines are located on the undersea plane of a bottom layer (a third game field). Then, a warfare is proceeded in the three-dimensional virtual game space including the respective planes by means of simulation performed by a computer system.

An explanation is hereinafter given about a cursor in the three-dimensional virtual space formed in the game fields of multiple layers. The cursor is used to display a target position, aim, flight area or the like. For example, as shown in FIG. 9, the cursor is used to display a current flight area on the plane of the sky (the first game field). However, when a plurality of game fields are observed from a viewpoint position off to the upper right/left in the world coordinate system and are displayed by transforming the world coordinate system into the screen coordinate system, it is difficult to clearly apprehend an area on the ground corresponding to the current position of the airplane. Moreover, when corresponding areas are separately indicated on the plane of the sky and on the plane of the ground as shown in FIG. 10, it is difficult to directly apprehend the correlation between them.

Accordingly, another invention of the present application indicates corresponding areas in the laminated game fields in the three-dimensional virtual space by using a three-dimensional cursor, thereby making it possible to easily apprehend the correlation between these areas.

Figure 11:
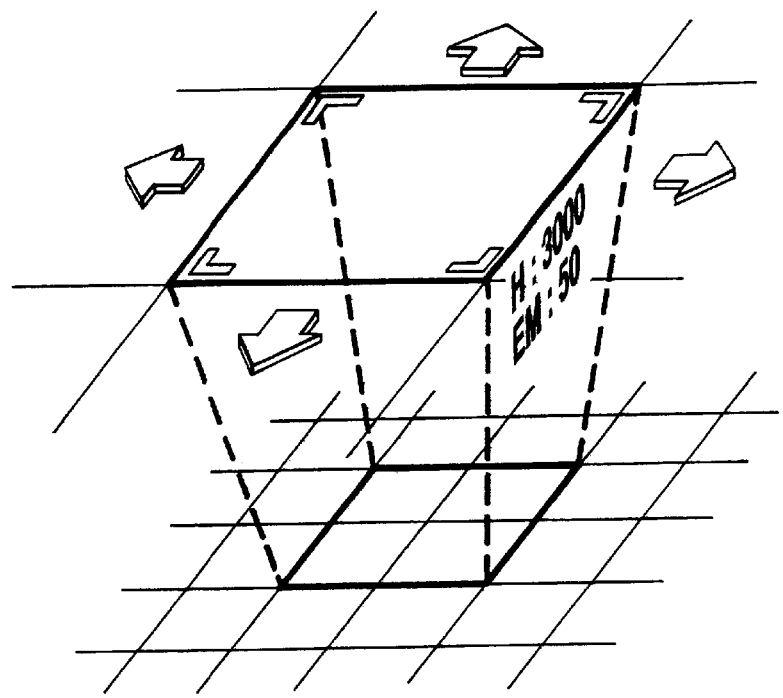
FIG. 11 shows an example of a three-dimensional cursor.

FIG. 11 describes an example of a cursor (hereinafter referred to as "three-dimensional cursor") which takes a three-dimensional figure extending over two game fields and displays corresponding areas. The top of the three-dimensional cursor is an area of the first game field and the bottom of the three-dimensional cursor is an area of the second game field, which corresponds to the area of the top. Vertexes of the top are linked with lines with corresponding vertexes of the bottom, thereby it is possible to determine the correlation between the top and the bottom at once. In this example of the three-dimensional cursor, the top is one large unit area, while the bottom is composed of four unit areas.

This is because a moving speed of an airplane is extremely different from a moving speed of a car and, therefore, the area on the ground is adjusted to a game scale of airplanes. FIG. 11 shows an example of the three-dimensional cursor used in the first game field and L-shaped cursors are displayed at four corners of the top area. Four arrow cursors are also displayed, which indicate directions in which the cursor can proceed. It is possible to display relevant information on the side face of the three-dimensional cursor. For example, in the case of the three-dimensional cursor indicating a flight area of airplanes, flight altitude information (H: 3000), danger degree information (EM: 50) for the area regarding dangers of antiaircraft fires, an area number (not shown) and the like are indicated.

Figure 12:
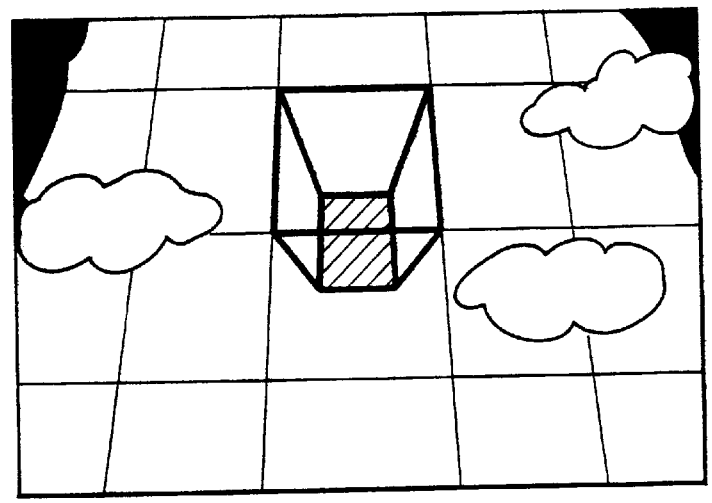
FIG. 12 shows an example of game fields as seen from a viewpoint at a high altitude.

FIG. 12 shows an example of the three-dimensional cursor displayed on the screen when the first game field is seen from high altitude. In this drawing, the area of the three-dimensional cursor on the ground is shown with oblique lines. A non-mapping portion outside the game fields is shown in black.

Figure 13:
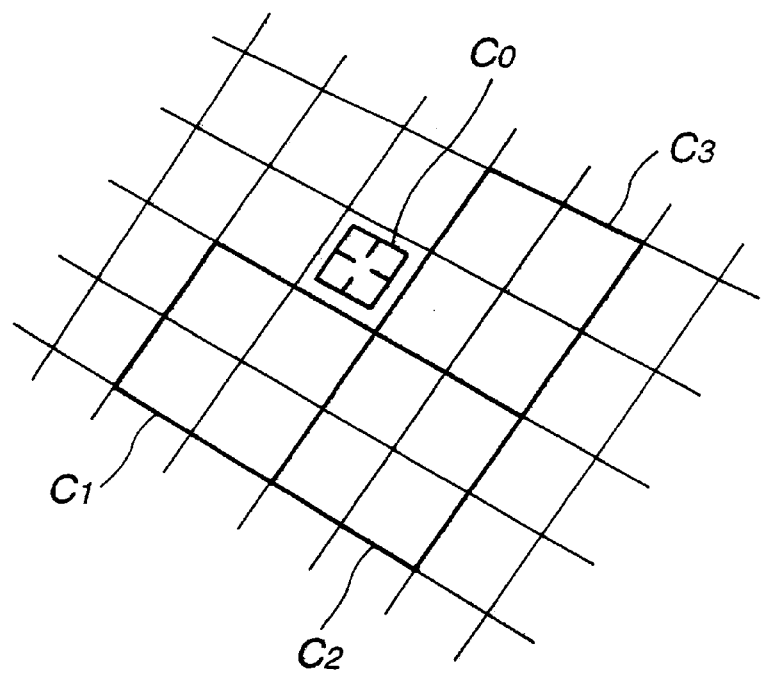
FIG. 13 shows a display example of the cursor when a first game field is seen from the viewpoint at a low altitude.

FIG. 13 shows an example of the cursor when the altitude of the viewpoint is lowered from a high altitude and the ground is observed from a low altitude. In this case, a cursor C0 takes the shape of a square of one unit area size with a line extending from the middle of each of the four sides toward the center of the square, and the cursor C0 moves in the same manner as a cursor used in a common game. Moreover, it is possible to project one-unit areas in the sky onto the areas on the ground and to display the contours C1, C2 and C3 of the projected areas. At this time, it is possible to show a person who holds the command of the air by classifying the contours C1, C2 and C3 by color.

Figure 14:
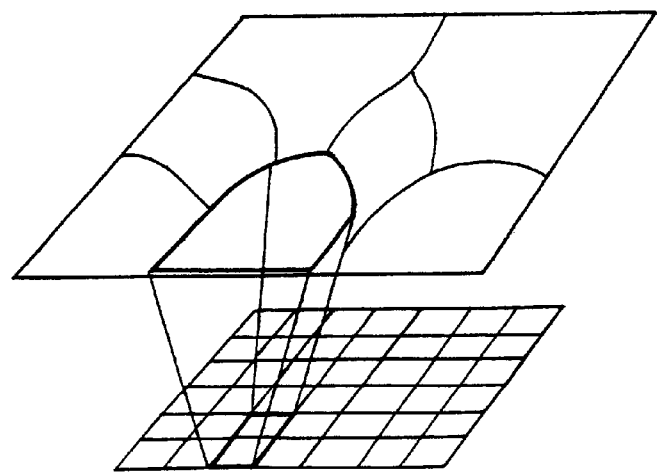
FIG. 14 shows another example of the three-dimensional cursor.

FIG. 14 shows an example of another three-dimensional cursor. In this example, the first game field is divided into regions and the second game field is divided into squares. Corresponding square areas are determined in accordance with center coordinates and vertex coordinates of the region and the three-dimensional cursor is drawn with straight lines or curves linking the vertexes of the region with the vertexes of the corresponding square areas.

Figure 15:
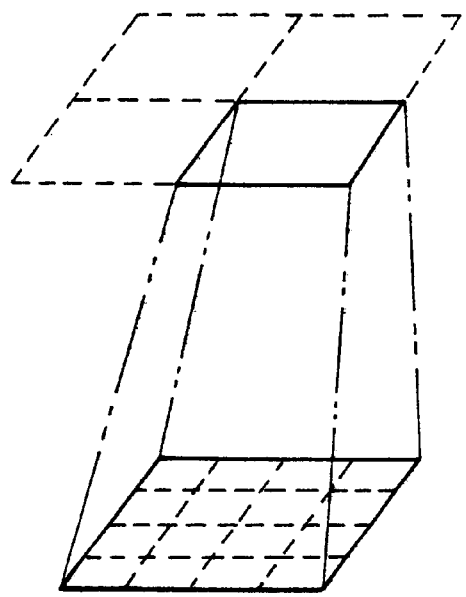
FIG. 15 shows a further example of the three-dimensional cursor.
Figure 16:
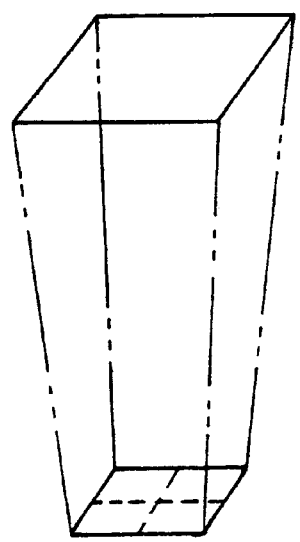
FIG. 16 describes an example of the three-dimensional cursor concerning in which consideration is given to a difference in the amount of information between the two game fields.

FIG. 15 shows an example of the three-dimensional cursor with which a one-fourth area in the sky corresponds to one area on the ground. FIG. 16 shows an example in which one area in the sky corresponds to four areas on the ground. There are some cases where an amount of information regarding, for example, game rules of a unit area in the sky are very different from that of a unit area on the ground. It is possible to improve the operability and comprehensibility by adjusting the size of the corresponding areas.

FIGS. 17 through 19 show examples of three-dimensional cursors which are displayed in a case of a ground attack by airplanes. FIG. 17 shows an example of the three-dimensional cursor for a fighter plane, FIG. 18 shows an example of the three-dimensional cursor for an attack plane and FIG. 19 shows an example of the three-dimensional cursor for a bombing plane. In each drawing, arrows extending in horizontal directions on the top of the cursor indicate a fighting capacity. An arrow extending downward indicates a bomb trace. The width of the downward arrow is decided in accordance with the degree of blasting power. A fighter plane has a high fighting (attack) capacity, but carries bombs of small destructive power. An attack plane has a fighting capacity of a medium degree and has large destructive power. A bombing plane has a low fighting capacity, but has strong destructive power in a wide range.

Figure 20:
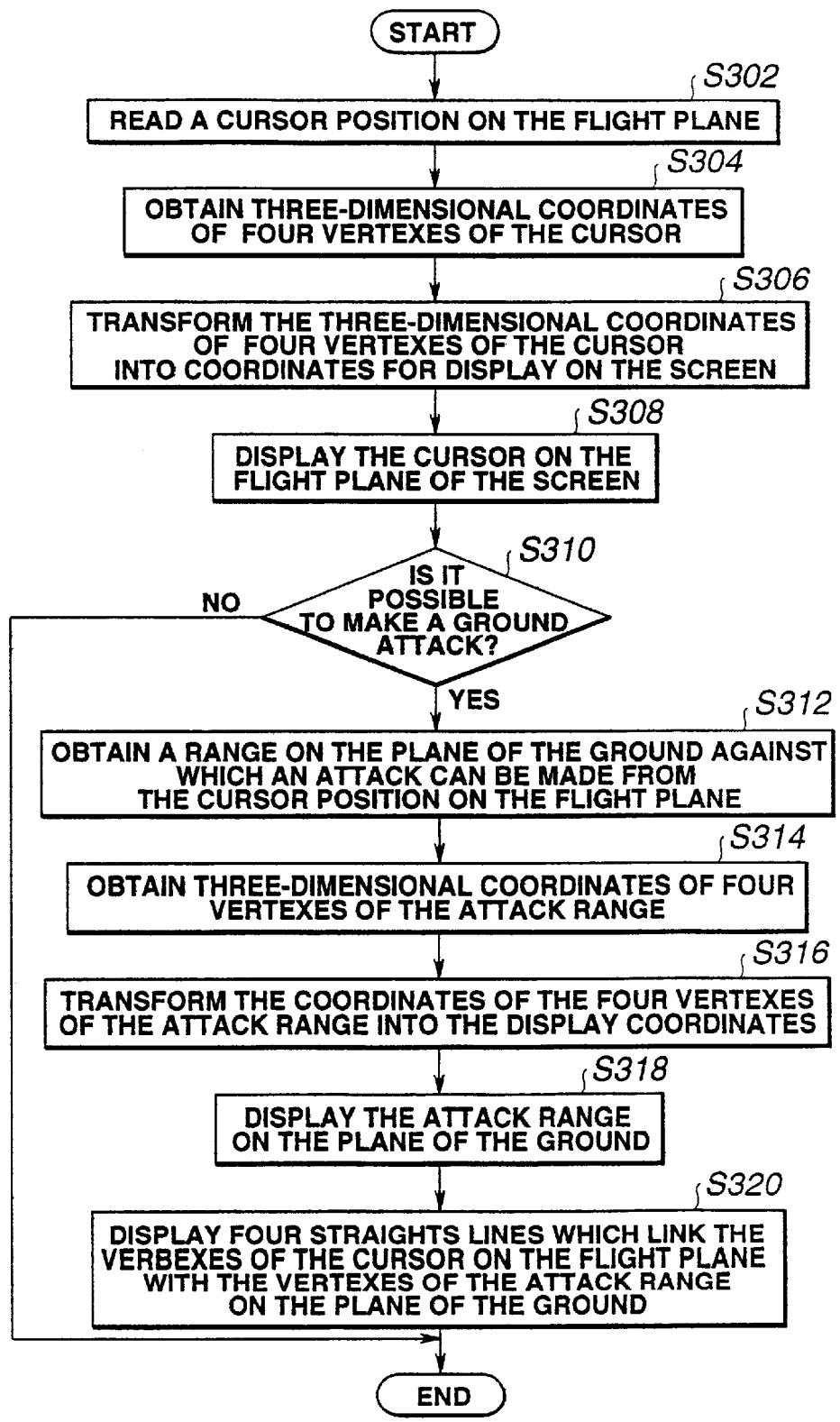
FIG. 20 is a flowchart which explains a display algorithm of the three-dimensional cursor.

FIG. 20 is a flowchart which explains an algorithm to display the three-dimensional cursor. If the main program (not shown) selects a three-dimensional cursor display routine, this routine is executed.

The CPU reads a position of a polygonal cursor on the plane of the sky (the first game field) (S302) and reads coordinates of each vertex of the cursor (S304). The coordinates of each vertex of the cursor are transformed into the coordinate system for display on the screen (S306). The transformed coordinates are drawn on the memory to display the cursor on the plane of the sky on the screen (S308).

It is determined whether or not it is possible to make a ground attack at this cursor position (S310). If it is impossible to make an attack (S310: No), this routine is terminated and the processing returns to the main program.

If it is possible to make a ground attack (S310: Yes), a range of the plane of the ground against which an attack can be made from the cursor position on the plane of the sky is read from a table or is obtained by calculation (S312). Such a range is made an attack range and vertex coordinates of the range are found (S314) The coordinates of each vertex of the attack range are transformed into coordinates of the display coordinate system (S316). The attack range is displayed on the plane of the ground (S318). Straight lines which link the cursor vertexes on the plane of flight with corresponding vertexes of the attack range on the plane of the ground are drawn to form the three-dimensional cursor which appears to be three-dimensional. At the time of such drawing, various kinds of information is written on the side face of the three-dimensional cursor (S320).

The three-dimensional cursor in the above-described shape is thereby obtained with its top indicating the cursor range on the plane of flight, and with its bottom indicating the attack range, and with the corresponding vertexes of both the ranges linked with lines to indicate the corresponding areas The three-dimensional cursor which is drawn in a three-dimensional manner over the first game field and the second game field in the three-dimensional virtual space may be made to undergo coordinate transformation to be displayed on the screen. Information such as an altitude, a danger degree and a flight area may be pasted as textures on the side face of the three-dimensional cursor.

Figure 21:
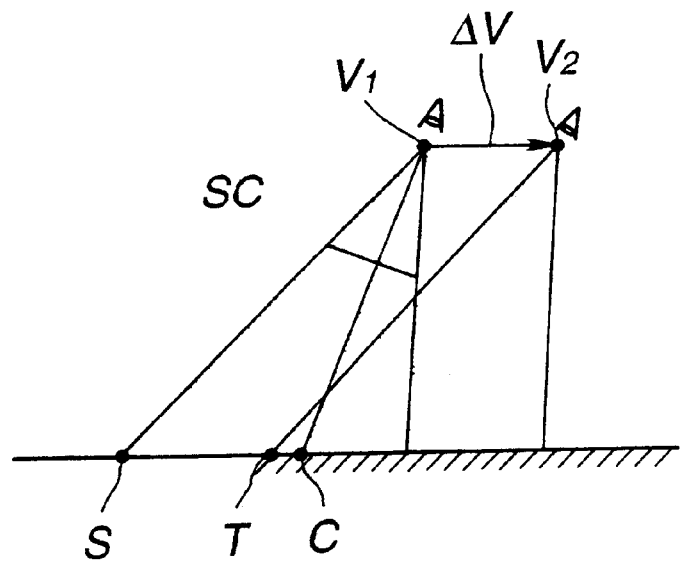
FIG. 21 explains the adjustment of a viewpoint position in a non-mapping area (or the upper edge) of the game field.
Figure 22:
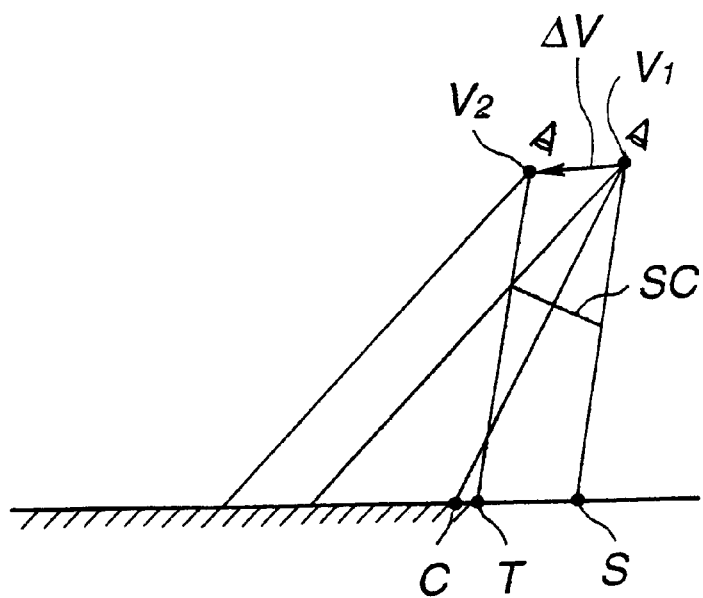
FIG. 22 explains the adjustment of a viewpoint position in a non-mapping area (or the lower edge) of the game field.
Figure 23:
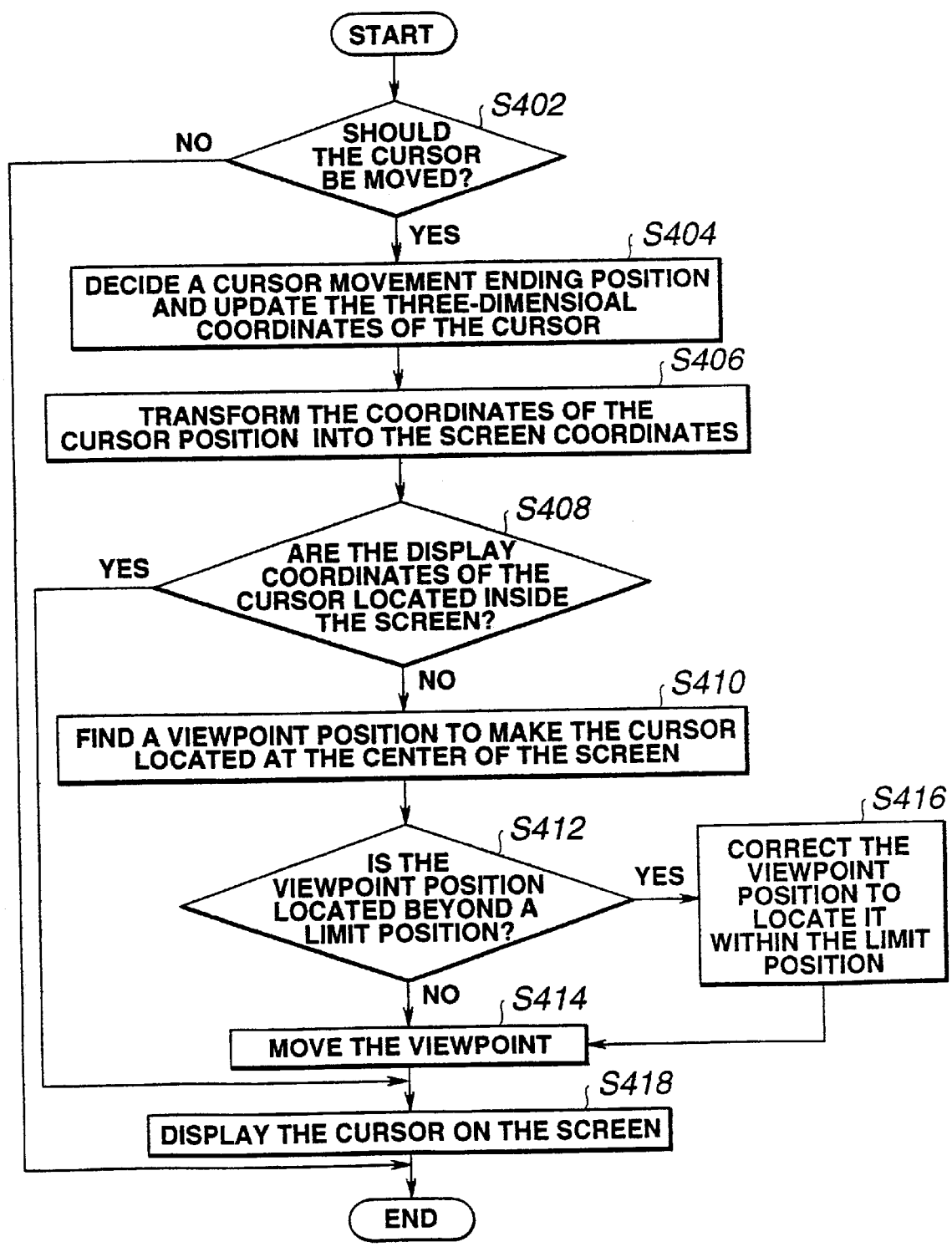
FIG. 23 is a flowchart which explains an example of an algorithm concerning the adjustment of the viewpoint position.

FIGS. 21 through 23 explain improvements to a display mode of the game field.

The game field of the ground is mapped and is designed in a manner such that a ground scenery can be observed from the sky. However, mapping (or picture pasting) is not applied to all parts of the game fields. When a non-mapping portion of the game field is observed from the sky, the non-mapping portion to which pictures are not pasted appears as a black zone on the screen as shown in FIG. 12. This is an unnatural picture and, therefore, it is desirable to cause the non-mapping portion not to appear on the screen.

Accordingly, if the view (or display area) extends beyond the mapped area, the viewpoint position is adjusted to return the view range to the mapped game field.

FIGS. 21 and 22 explain such processing. FIG. 21 shows the state in which the cursor has moved close to the upper edge of the map. In this drawing, the mapped picture ends at the portion with oblique lines, beyond which is displayed in black.

If the cursor is located at a point C close to the upper edge of the map, the viewpoint position is at V1. At this point, roughly the upper half or larger area of a picture appearing on the screen is displayed in black. Accordingly, the viewpoint position is moved from V1 to V2 in order to make an adjustment so that the black portion outside the map will not come within view. A movement distance of the viewpoint can be obtained as follows.

When the letter "S" represents a point where a straight line linking the viewpoint V1 with the upper edge of a virtual screen (or a plane of projection) SC intersects the map plane and the letter "T" represents the upper edge of the map, a correction value ΔV is obtained by the following formula:

$$\Delta V = V1 - V2 = S - T$$

It is possible to obtain ΔV by using the coordinates of the point S and the point T. The viewpoint position is moved by ΔV from the viewpoint position V1 to correct it to the viewpoint position V2. The black portion will not appear in screen picture taken from the viewpoint V2. Such an adjustment is made in the x-axis direction and the y-axis direction.

FIG. 22 shows the state where the cursor has moved close to the lower edge of the map. In this drawing, the portions corresponding to FIG. 21 are given the same reference numeral. In this case as well, it is possible to cause the black portion appearing in roughly the lower half of the screen at the viewpoint position V1 to disappear by moving the viewpoint position V1 to the position V2 by ΔV in the same manner as described above.

An explanation is hereinafter given with reference to FIG. 23 about an algorithm for determination of margins of the viewpoint position and for adjustment of the viewpoint position.

Inside the CPU, a cursor movement control means for moving the cursor in accordance with operation of the pad 2b or a joystick is formed. A viewpoint control means is also formed for following the viewpoint so that the position of the cursor will be located, for example, in a line-of-sight direction. The main program detects that a command to move the cursor has been given by the pad or joystick (S402) and the processing then shifts to this routine.

A movement ending position of the cursor is decided on the basis of the command of movement and the coordinates of the cursor in the three-dimensional virtual space are updated (S404). The coordinates of the cursor are transformed into the screen coordinate system for the television screen (S406). It is determined whether or not the cursor position of the screen coordinate system is located inside the screen (S408). If it is inside the screen, the cursor is displayed on the screen (S418) and the processing returns to the main program.

If the cursor position is not inside the screen (S408), the viewpoint position which will make the cursor located at a central position of the screen is obtained (S410). It is determined whether or not this viewpoint position is beyond a limit position. For example, as described in FIG. 21, a determination is made on the basis of whether or not the position of the cursor C has moved beyond the edge T of the mapping area (S412). It is also possible to previously define the area within which the viewpoint can move on condition that the aforementioned non-mapping area will not be caused to appear, and to set the margins of this area as the limit positions.

If the viewpoint position is not beyond the limit position, the viewpoint is moved to the center of the screen (S414). If the viewpoint position is beyond the limit position, a position correction amount is calculated so that the viewpoint position will come within the limit position. For the calculation of the correction amount, the algorithm to obtain ΔV, which has been described with reference to FIGS. 21 and 22, can be used (S416). The viewpoint is moved to a corrected position (S414). The cursor is displayed in a picture as seen from this viewpoint (S418).

Such a procedure to change the viewpoint makes it possible to cause the non-mapping portion (the black portion) not to be displayed on the screen.

An explanation is hereinafter given with reference to FIGS. 24 through 26 about an expression of raining which will give a taste of three dimensions as seen from the viewpoint looking down from the sky.

Figure 24:
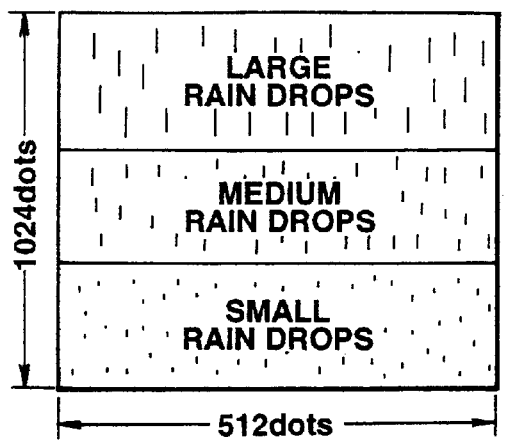
FIG. 24 shows an example of a V-RAM which retains raining patterns.
Figure 25:
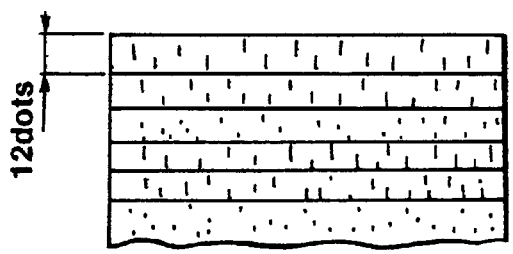
FIG. 25 shows an example of a picture on a TV screen.

First, as shown in FIG. 24, a storage area for a rain basic pattern is secured on the V-RAM. For example, a display area of 512×1024 dots is secured. This area is divided into, for example, three areas which form three stages, top, middle and bottom. A large number of large rain drop patterns are written on the top area. A large number of medium-sized rain drop patterns are written on the middle area. A large number of small rain drop patterns are written on the bottom area.

Next, a picture for scrolling is divided in a vertical direction into an appropriate width, for example, a 12-dot (or 12-line) width, thereby forming strip-shaped areas. Then a line scrolling function of the VDP 130 is utilized to display large, medium and small rain drops repeatedly in the respective strip-shaped areas on the screen as shown in FIG. 25. In doing so, the area of the large rain drops is scrolled at a comparatively high speed, the area of the medium rain drops is scrolled at a medium speed, and the area of the small rain drops is scrolled at a slowly speed. Boundaries between the strip-shaped areas are slowly moved downward so that the boundaries will be made inconspicuous.

Such picture processing makes it possible to give a player a visual effect of causing rain drops to seem falling from the sky down to the ground.

Figure 26:
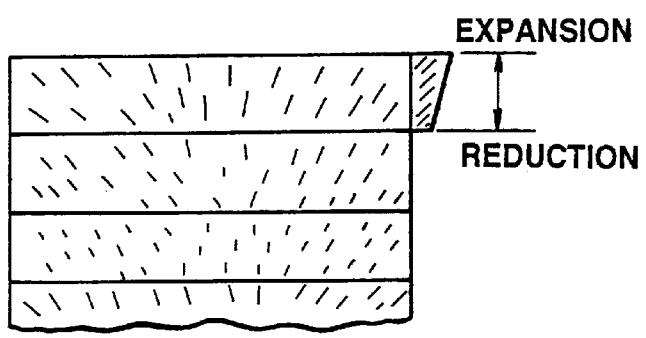
FIG. 26 shows an example of reduction and expansion of strip-shaped areas.

Moreover, as shown in FIG. 26, in each strip-shaped area, the upper edge line of the area is expanded and displayed and the area is displayed by reducing an expansion ratio as going down to lower lines from the upper edge line. The expansion ratio k of each line is represented by the following formula:

$$k = 1/(1 - \alpha \times \text{line number})$$

The letter "α" is approximately 0.015 and the line number of the upper edge of the area is 11 and the line number of the lower edge of the area is 0.

By performing such picture processing and displaying resultant pictures, it is possible to give a player a visual effect of causing the rain drops to seem falling toward and gathering at the center of the screen.

Figure 27:
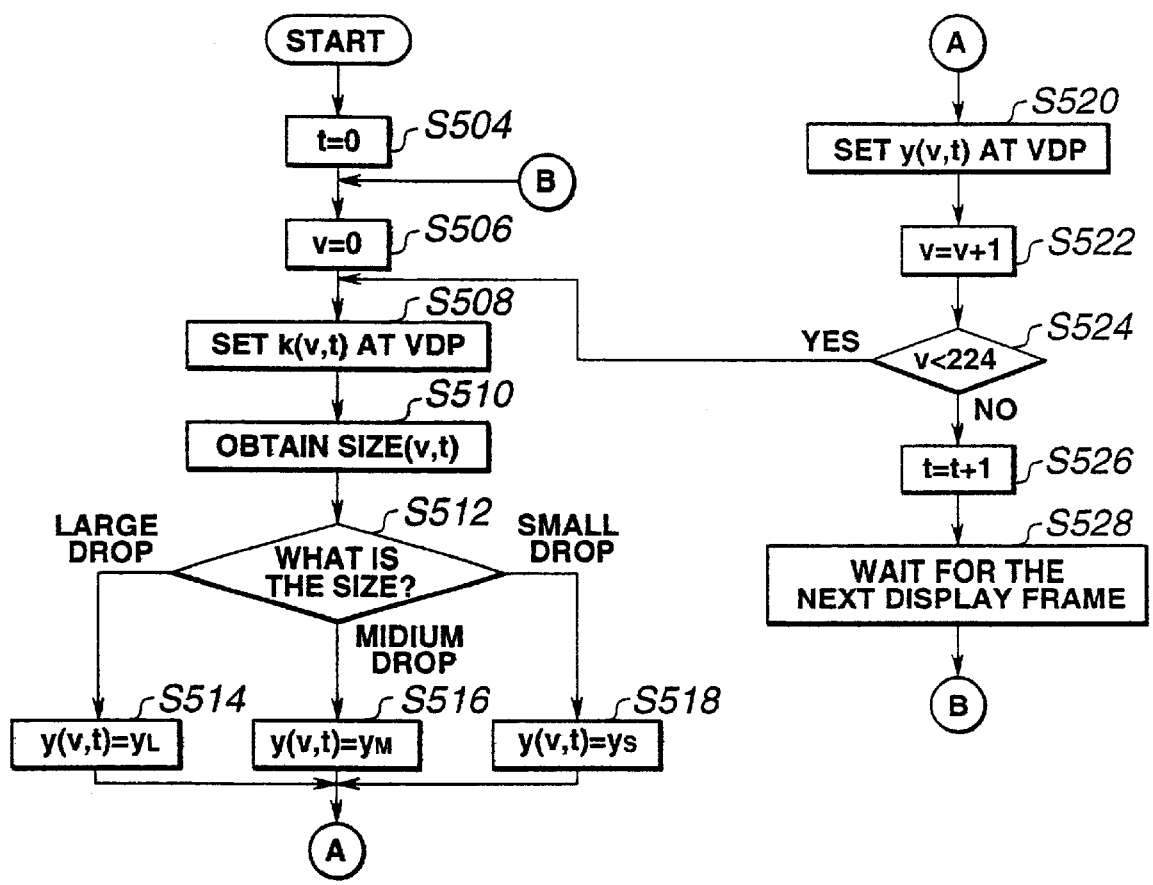
FIG. 27 is a flowchart which explains an algorithm for forming a picture which will realize a visual effect of the state of raining.

FIG. 27 shows a display algorithm to realize the above-mentioned raining.

First, a time parameter (the number of frames) t is initialized (S504). A parameter v. (0<v≦224) is initialized, which represents a vertical direction coordinate on the television screen (S506). A reduction/expansion ratio (or scale factor) function k(v, t) which decides the size of rain drops is set at the VDP (S508). Accordingly, the reduction/expansion ratio of a certain line of a certain frame is set.

The function k(v, t) can be obtained by the following formula when the letter "b" represents a residual of a division of (v+s·t) divided by twelve, the number of lines: k(v, t)=1/(1−(11−b)×α). The letter "s" is the moving speed for the boundaries between the strip-shaped areas. Eleven is the line at the upper edge of the strip.

Then, a size function size(v, t) which represents the size of rain drops is used to read the size (S510).

According to the function size(v, t), the following results are obtained on condition that the letter "a" represents a residual of a division of (v+s·t) divided by 36, the number of lines (12 lines×3). When a is less than 12 (a<12), size(v, t) results in large rain drops. When a is greater than or equal to 12 and is less than 24 (12≦a<24), size(v, t) results in medium rain drops. When a is greater than or equal to 24 (a≧24), size(v, t) results in small rain drops. When (v+s·t) is greater than 224 ((v+s·t)>224), 224 is subtracted from (V+s·t).

Subsequently, on the basis of the results of the rain drop size as described above, the y coordinate value y(v, t) of the V-RAM, which corresponds to each line of the television screen is obtained (S512 through S518).

Assuming that respective speeds of the large, medium and small rain drops are SL, SM and SS, the coordinate on the V-RAM to be displayed is yL(v, t)=v+SL·t in the case of large rain drops. However, if (v+SL·t) is greater than 511 ((v+SL·t)>511), 512 is subtracted from (v+SL·t) (S514). In the case of medium rain drops, the coordinate to be displayed is yM(v, t)=v+SM·t. However, if (v+SM·t) is greater than 767, 256 is subtracted from (v+SL·t) (S516). In the case of small rain drops, the coordinate to be displayed is yS(v, t)=v+SS·t. However, if (v+SS·t) is greater than 1023, 256 is subtracted from (v+SS·t) (S518).

The y coordinate value y(v, t) on the V-RAM is set at the VDP. Accordingly, a reduction/expansion ratio and a reading position at the y(v, t) position are set at the VDP and the rain pattern stored on the V-RAM is drawn at the designated reduction/expansion ratio (S520).

Subsequently, one line is added to the coordinate v of the vertical direction of the screen (S220). It is determined whether or not the y coordinate v has reached the last line of a frame (S224). Until it reaches the last line, the steps S508 through S522 are repeated to perform drawing for one frame.

When the coordinate v has reached the last line, one is added to a frame number (S526) and the processing waits for the next frame display timing (S528). The variable v is reset (S502) and the same processing (S508 through S524) is repeated from the first line of the next frame.

This algorithm can be performed from the upper edge of the screen toward the center of the screen or from the lower edge of the screen toward the center of the screen. Moreover, by changing a method of obtaining coordinates, it is possible to perform the algorithm from the left edge of the screen to a rightward direction or from the right edge of the screen to a leftward direction.

Images of raining which are drawn by the above-described algorithm can give a player a visual effect of causing the rain drops to seem falling toward the center of the screen.

As described above, the present invention is capable of shifting pictures (or viewpoints) from one game field to another game field and, therefore, is capable of easily expressing the correlation between the fields, for example, in the sky, on the ground, on the sea, under the ground and under the sea. Since it is possible to construct a game system for each game field, it is easy to have games of different algorithms, scroll speeds, game scales or the like coexist.

When the viewpoint is located in the sky, an upper layer and a lower layer are simultaneously displayed, thereby obtaining an easily comprehensible image for a game such as a bombing game or an air battle. It is also possible to express, for example, clouds between the game fields by using a semitransparent function.

Other than the case where a plurality of game fields are laminated in a vertical direction, that is, one over the other, the game fields may be laminated in a horizontal direction,, that is, from right to left or vice versa. Moreover, a plurality of game fields may be formed in a partial area of the three-dimensional virtual space.

As described above, this invention makes it possible to form game fields in plural layers in the three-dimensional virtual space, thereby proceeding games in a manner such that the games proceed in the respective game fields simultaneously. It is also possible to proceed a game by using an individual algorithm for each game field. It is possible to move a viewpoint continuously between the fields. It is also possible to proceed a game by correlating the game fields.

Moreover, the corresponding areas in the game fields are expressed with a three-dimensional cursor, thereby obtaining a cursor which makes it easy to understand the correlation between the corresponding areas.

Furthermore, according to this invention, a viewpoint position is determined so that a non-mapping area of a game field will not be displayed. Accordingly, it is possible to avoid display of unnatural objects on the screen.

This invention also makes it possible to form pictures which show something such as rain or snow falling from the sky down to the ground.

What is claimed is:

1. A game device for a game which proceeds by placing objects related to the game in a three-dimensional virtual space and by controlling said objects, comprising:

first game proceeding means for proceeding the game by controlling said objects in a first game field in said three-dimensional virtual space;

second game proceeding means for proceeding the game by controlling said objects in a second game field in said three-dimensional virtual space; and perspective transformation display means for forming a screen picture by transforming coordinates of each object in said first game field and said second game field existing within view of a viewpoint located in said three-dimensional virtual space; wherein said first game proceeding means and said second game proceeding means determine respective proceeding speeds of said first game field and said second game field separately.

2. A game device according to claim 1, wherein when the viewpoint is moved between said first game field and said second game field, said perspective transformation display means reduces the first game field and displays a reduced game field, obtained by reducing the first game field, in a picture of the second game field.

3. A game device for a game which proceeds by placing objects related to the game in a three-dimensional virtual space and by controlling said objects, comprising:

first game proceeding means for proceeding the game by controlling said objects in a first game field in said three-dimensional virtual space;

second game proceeding means for proceeding the game by controlling said objects in a second game field in said three-dimensional virtual space;

mutual processing means for processing the game between said first game field and said second game field and for placing and controlling said objects in relation to said processing; and perspective transformation display means for forming a screen picture by transforming coordinates of each object within view of a viewpoint located in said three-dimensional virtual space, wherein said first game proceeding means and said second game proceeding means determine respective scroll speeds of said first game field and said second game field separately.

4. A game device according to claim 3, wherein when the viewpoint is moved between said first game field and said second game field, said perspective transformation display means reduces the first game field and displays a reduced game field, obtained by reducing the first game field, in a picture of the second game field.

* * * * *